United States Patent [19]

Ackermann et al.

[11] 4,430,126

[45] Feb. 7, 1984

[54] HYDRAULICALLY SETTING SHAPED BRICK, PARTICULARLY FOR CONSTRUCTION, AND METHOD FOR ITS PRODUCTION

[75] Inventors: Manfred Ackermann; Rolf Köhling, both of Bochum; Dieter Leininger, Essen, all of Fed. Rep. of Germany

[73] Assignee: Bergwerksverband GmbH, Essen, Fed. Rep. of Germany

[21] Appl. No.: 352,847

[22] Filed: Feb. 26, 1982

[30] Foreign Application Priority Data

Feb. 27, 1981 [DE] Fed. Rep. of Germany ....... 3107374
Dec. 3, 1981 [DE] Fed. Rep. of Germany ....... 3147855

[51] Int. Cl.$^3$ .................... C04B 31/02; C04B 31/12
[52] U.S. Cl. .................................... 106/97; 106/118; 106/120; 501/123; 501/124; 501/155
[58] Field of Search ................... 106/90, 97, 118, 120; 501/123, 124, 155

[56] References Cited

U.S. PATENT DOCUMENTS

| | | | |
|---|---|---|---|
| 1,548,716 | 8/1925 | Fournier | 106/97 |
| 2,524,947 | 10/1950 | Wallace | 106/97 |
| 2,758,033 | 8/1956 | Burney et al. | 106/97 |
| 3,870,535 | 3/1975 | Minnick et al. | 106/118 |

Primary Examiner—James Poer
Attorney, Agent, or Firm—Michael J. Striker

[57] ABSTRACT

With hydraulically setting shaped brick, particularly for construction, composed of (a) 4 to 30% by weight hydraulically or similarly acting binding agent, such as cement, high-hydraulic lime, lime or hydraulically reacting plastic or mixtures thereof;

(b) about 60 to 95% by weight mineral aggregate material; and (c) 0 to 10% by weight other additions, the raw material basis is extended with regard to aggregate material, and deposited amounts of country rock from mining are reduced, since the aggregate material is composed of country rock (mining waste material) from mining, particularly hard coal mining, with a grain size up to 15 mm and a finest grain portion under 0.2 mm from 10 to 45% by weight. To produce the shaped brick, the mixture is shaped and then hardened. Through particular choice of granulation and density, the mining waste material can be adjusted to desired quality characteristics and the physical characteristics of the shaped brick varied, corresponding to utility.

33 Claims, 1 Drawing Figure

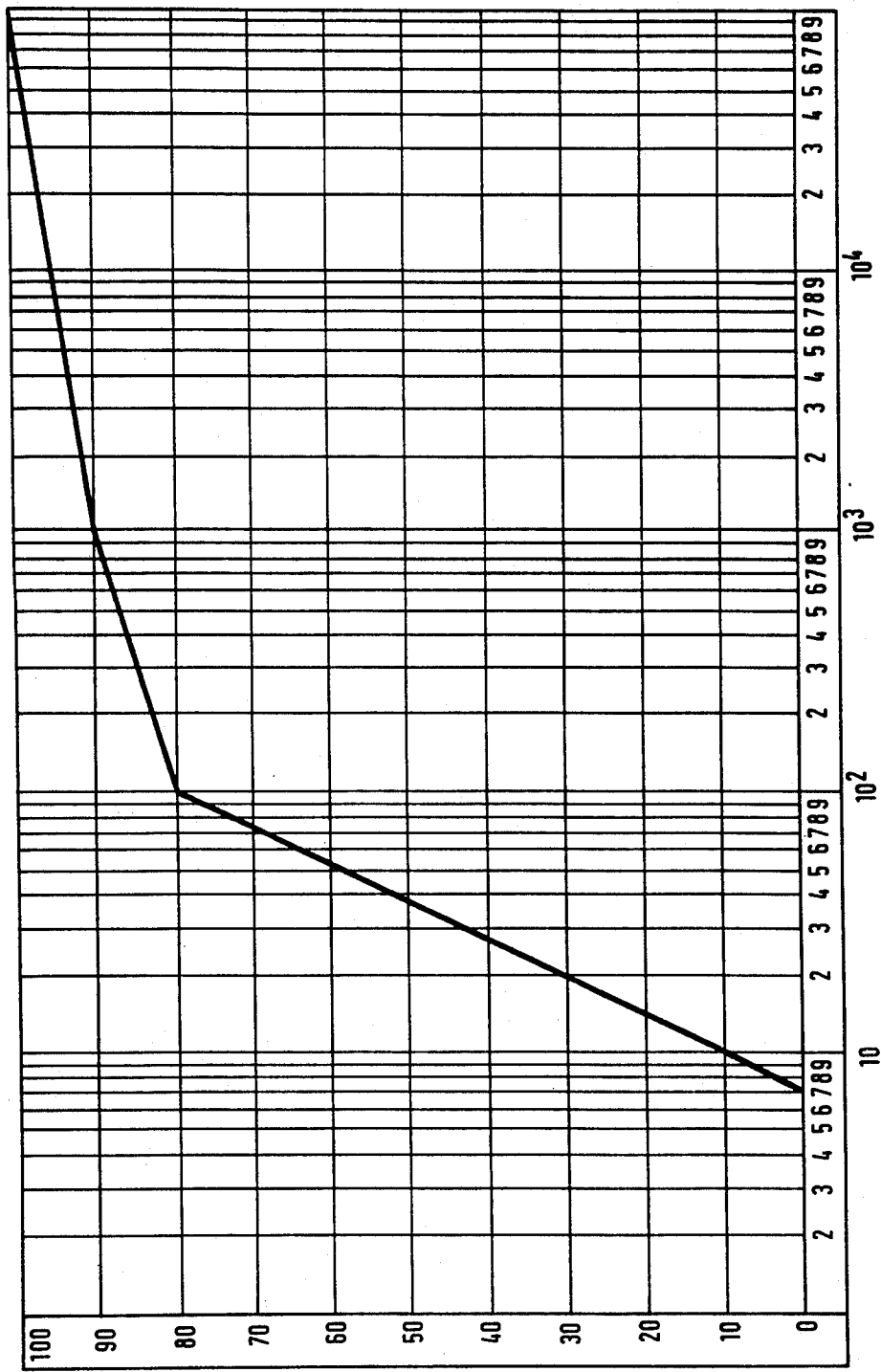

HYDRAULICALLY SETTING SHAPED BRICK, PARTICULARLY FOR CONSTRUCTION, AND METHOD FOR ITS PRODUCTION

BACKGROUND OF THE INVENTION

The invention concerns a hydraulically setting shaped brick, particularly for construction, and a method for its production.

Shaped brick of the above mentioned type is used in the construction industry in great amounts, on the one hand in the form of sand-lime brick, and, on the other hand, in the form of cement brick, with which the mineral flux material (so-called aggregate) is composed of sand. Herewith by shaped bricks is to be understood, that the starting material is poured into pre-fabricated and/or specified molds, and then subsequently hardened inside or outside (after its removal) of the mold. In contrast to the shaped bricks burned from loam or clay, cement bricks have the advantage that their production is less expensive and requires less energy, sand-lime brick displaying beyond that particularly high strength. On account of decade-long great demand, the raw material basis for many sand-lime brick and cement brick producers has considerably decreased through the exhaustion of particular deposits, so that the customary raw material (sand) must be transported over great distances.

With the method according to German Patent DE-PS No. 26 39 178, instead of sand, a broken slag granulation, in particular granulated blast furnace slag, is used as aggregate material together with lime as binding agent for the production of lime granulate bricks, which in their characteristics correspond to or approach the customary lime-sand bricks.

Therewith the aggregate material is produced in such manner that the slag is ground through crushing, so that the finest grain portion of the granulate, below 0.2 mm, amounts to 15 to 50% by weight. As binding agent, lime is used in a portion from 1 to 6% of the total weight, calculated as CaO.

From German Offenlegungsschrift DE-OS No. 25 22 851 it is known to form a hydraulically setting construction material for roadbuilding, its mineral grain mixture composed completely or predominantly of washed mining waste material from coal mining, which is solidified and cement-stabilized with 4 to 15% by weight cement or lime as binding agent; herewith the washed mining waste material is used without pretreatment.

In mining, above all in coal and particularly in hard coal mining—but also in ore mining—considerable amounts of country rock (mining waste material) appear in the crude, raw ore, whereby the portion of this mining waste material amounts to about 45% of the raw output, e.g. in hard coal mining. Through multiple-stage working up, the mining waste material is separated from the coal or the ore, and then by far predominantly deposited. Efforts towards a further use of the material have indeed so far led to a considerable reduction of the amounts deposited; nevertheless, still always the preponderant amount of waste material must be deposited. The difficulties with the yield and use are based on, among others, the instability, the inhomogeneity, and the content of burnable components of this material. A portion of the mining waste material produced is often brought to the surface already separated. Often, this mining waste material is brought to the surface together with the raw coal or the raw ore, and led to the appropriate working-up plants; they are then components of the so-called treatment tailings, in particular the washed mining waste material.

SUMMARY OF THE INVENTION

The invention is therefore based upon the object of disclosing a new area of use for the mining waste material, in particular the washed mining waste material from hard coal mining, and moreover to expand the raw material basis for the lime-sand brick, and also the cement brick industry.

The shaped brick according to the present invention is suitable in particular for:
high stress brickwork or masonry
thermal insulating brickwork or masonry
shaped brick for outdoor use such as:
 sidewalk surfaces
 edge and corner bricks
 flooring bricks
 plaster, among others
concrete pipe
shaped brick for shaft linings
hydraulic construction bricks, among others.

On account of the negative characteristics (e.g. the striking disintegration tendency) of the mining waste material, it must be considered surprising that this material can nevertheless come to light as substitute instead of sand, also for the area of use of shaped bricks for construction. The only prerequisite with regard to the extraction of the mining waste material according to the present invention is its origin from country rock, that it is brought to light with digestion and/or with the extraction of mineral wealth. Preferred are mineral resources which arise out of a sedimentation process. The mining waste material should contain a minimum portion of about 50% by weight $SiO_2$, when it is used for silicate hydrate bound shaped bricks; for cement bound or plastic bound shaped bricks, there exists no limit with regard to the $SiO_2$-content.

It has surprisingly been shown that the shaped brick according to the present invention is easily produced according to different production variations, e.g. the lime-sand brick process, since the disintegration of the mining waste material is prevented through enveloping of the individual grains, and disturbing impurities such as e.g. coal or ore residue can be removed from the mining waste material. Such bricks possess outstanding characteristics: the shaped brick has a high bending strength, a high compression strength, and it is outstandingly durable against frost fatigue. Its total pore volume is low, with an unusually high portion of finest pores. In spite of its manifestly smooth surface, its degree of binding to adjacent mortar forms is unusually high. Impact breaks do not occur along the grain boundaries of the bricks, but as a result of grain breaks. To some extent, these characteristics can be attributed to the fact that the granulates of mining waste material display a high portion of laminated (lobed), stalked (stalk-like) grains. Moreover, the mining waste material, with grinding, is inclined to the formation of a large portion of finest grains, so that a highly reactionable surface for silicic acid compounds is available, and a more favorable finest pore fraction is obtainable. The amount of water, which is necessary to produce the shaped bricks does—if not mentioned especially—not significantly differ from the values well known in the art when using sand as mineral aggregate material.

Shaped bricks for plaster use, street edge brick and the like should contain binding agent portion between about 10 and 30% by weight, and perhaps 2 to 10% by weight other admixtures, e.g. customary dyes and the like; for wear-, abrasion- or high pressure-resistant bricks, preferably an aggregate material is used which displays up to 60% by weight of known granulated hard material, composed of or produced from a hard rock or metal; the hard material can involve e.g. sand, pea gravel, basalt, glass, steel scrap-metal, among others. The hard material then displays, as a rule, a coarser granulation than the mining waste material—approximately the coarse granulation portion of otherwise customarily used gravel for the plaster bricks in question; the mining waste material should then be freed of the finest (silt) granulation portions.

The use of mining waste material from hard coal mining has proven to be particularly advantageous. Particularly favorable, mainly in view of the already naturally present grain band width, is the use of at least 50% of the aggregate material being composed of ground washed mining waste materials. The grain band width amounts to between about 0 and 200 mm, as a rule from 0 to 150 mm.

It is particularly surprising that the mining waste material can be used for silicate hydrate bound shaped bricks, containing 5-10% lime, calculated as CaO and 88-95% by weight aggregate material containing about ⅓ to ⅔ silicic acid, as well as 0-2% by weight of other additions as residue, since with such known shaped bricks as lime-sand brick the chemical reaction follows between the reaction agent lime and the $SiO_2$-portion of the aggregate material, and therefore up to now exclusively quartz-rich sand has been used as aggregate material in the lime-sand brick industry. The bricks produced with hydraulically reacting plastics have acid-resistant, improved resiliency, abrasion-resistant and tenacious characteristics. It should be understood that mixtures of the above mentioned binding agents are also possible according to the present invention, to the extent that the binding agents are compatible with one another.

Shaped brick according to the present invention has a composition of:

(a) 4-30% by weight hydraulically or similarly acting binding agents, such as cement, high hydraulic lime, lime or hydraulically reacting plastics, or mixtures of such binding agents, (b) about 60-95% by weight mineral aggregate material, and (c) 0-10% by weight of other admixtures, with the aggregate material composed of country rock (mining waste material) from mining, with a grain size up to 15 mm and a finest grain portion, below 0.2 mm, from 10 to 45% by weight. Preferably, the aggregate material is composed of ground washed mining waste material, and is present in an amount of at least 50% by weight. Washed mining waste material is a mining waste material, which has passed the well known washing process within the preparation plant (foreafter called "separation plant"). All weights of washed mining waste material will be based upon the water free material.

The shaped bricks according to the present invention can be produced by pouring or pressing the mixture of binding agent, granular aggregate material and water into molds, and subsequently hardening, in particular in autoclaves, or under addition of reaction-promoting and boiling point-increasing substances, such as sodium hydroxide, hardened under normal pressure, characterized in that the mining waste material is ground to a grain band up to 15 mm maximum grain size, with a finest grain portion, under 0.2 mm, from 10 to 45% by weight, in particular being obtained through milling or separation measures, and that the so obtained mining waste material granulates are used as aggregate material. In particular, this is done according to the otherwise lime-sand brick processes, whereby the hardening follows in known manner under pressure or without pressure in the atmosphere, or in a steam chamber. Preferably, the upper limit for the grain band of the mining waste material granulates amounts to 5 mm.

It has been shown that the grinding of the material through a grain band with an optimal portion of finest grains under 0.2 mm, as well as the particular grain shape, gives the mentioned advantageous characteristics of the shaped bricks, which satisfy in particular requirements for particularly high density. A measured higher finest grain portion of the mining waste material granulates effects, in particular with the lime-sand brick according to the present invention, also the advantage that the disintegration tendency of the material is positively eliminated when the mining waste material granulates contain a finest grain portion, under 0.2 mm, amounting to from 18 to 35% by weight, with the following preferable component ranges (grain sizes): 0-0.01 mm, 4-10% by weight; 0.01-0.2 mm, 14-31% by weight.

Since the mining waste material produced in the separating plants has a heterogeneous composition and displays particularly disturbing portions of residue, e.g. coal and interstratified material, it is necessary before or with grinding to perform a pretreatment for separating the disturbing components; as a rule, it suffices to subject the material to a classification as follows: the mining waste material in a granulation from 0 mm up to about 200 mm or more, particularly washed mining waste material, is classified in such manner that the grain band up to a maximum of 60 mm, preferably up to 56 mm, is discharged (classified out), and the separated coarse portion is ground and used as aggregate material. When somewhat lower demands are placed on the shaped brick, or when the mineralogical/petrographical assessment of characteristics of the mining waste material allows, only the grain band up to maximum 30 mm is classified out. It has surprisingly been shown that solely through classification of the washed mining waste material there is produced a good starting material for the shaped bricks, with which particularly disturbing portions are decreased to a non-serious residue.

In many separating plants, the mining waste material, based upon the particular separation process, are already produced in usable grain size ranges (grain band up to maximum 30 mm is classified out); for example, coarse mining waste material (greater than 70 mm), fine washed mining waste material (10-0.5 or 10-2 mm), or mining waste material from coarse slurry sorting (2-0.1 mm); then the classification is not necessary.

It has, moreover, been surprisingly been shown that not only the classification of the washed mining waste material, but also the sorting according to density, is a suitable measure, in order to eliminate disturbing components. Thereby the range of use can partially also be extended to washed mining waste material of the grain size range, e.g. below 60 to about 0.1 mm. Washed mining waste material, which having grain size below 60 mm, preferably up to 56 mm or below 30 mm, as mentioned above, is removed, yet can, along with mining waste material which results from the separation plants in the same grain size distribution, be subjected to a density sorting, and also used according to the present invention. The crude density $\rho_c$ is calculated in known manner from the mass $m_{dr}$, determined after drying at 105° C., and the crude volume $V_c$, which includes the pores and interstices, as $\rho_c = m_{dr} : V_c$. The crude density is therefore always determined from the real grain band. A still dependable, but more involved measure of density is the material density $\rho$, calculated from the volume of a material without pores and interstices, related to mass m by $\rho = m : V$ (kg/l). (See Prof. Dr. Hermann Schäffler, Baustoffkunde 1982, Vogel-Verlag, Kamprathreihe).

The produced washed mining waste material, particularly in the granulation smaller than 56 mm, can have a moisture content before the grinding which in certain cases is capable of hindering the milling in customary mills. In order to remedy this, it is recommended, particularly for silicate hydrate bound shaped brick, to add the necessary reaction agent in the form of lump lime, to the mining waste material, when the material can be further worked up on short notice. In normal cases it is recommended to mix moist material with a moisture preferably above 10% by weight (in particular with a granulation below 60 mm), before the milling, with coarser mining waste material. With cement bound shaped bricks one can decrease the binding agent by classifying the mining waste material granulate, after the grinding, to obtain mining waste material granulates in the grain size range approximately above 0.01 mm, preferably above 0.063 mm, which is then used for the shaped brick. On the other hand, the reactionability can be increased by adding mining waste material granulates in the grain size range below about 0.01 mm, preferably below 0.063 mm, to the mining waste material granulates for silicate hydrate bound shaped brick. With use of coarser mining waste material, the disturbing development of dust can be decreased through the addition of finer and moister waste material of suitable density.

The aggregate material according to the present invention can obviously also be modified in known manner, through an addition of light aggregate material, or, in particular for cement bound shaped brick, hard aggregate material, shaped brick with modified characteristics, for example with regard to heat conductivity or higher compression- and wear-resistance, thereby produced. For example, flue dust may be added as light aggregate material, or pea gravel may be added as hard aggregate material. Flue dust is a mineral component of flue gas from industrial combustion plants, which is separated in the dust removers; pea gravel is a grain fraction of quartz sand with a granulation from, as a rule, 8 to 2 mm.

The concentration of the prepared mixture in molds can follow in known manner through extrusion or jar ramming; however, it is expedient to adjust the pressing moisture clearly lower and the cement or lime content somewhat lower, than with the production of cement or lime-sand bricks with natural quartz sand.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a graph of the distribution of pore radii, by volume percent portion, for shaped brick according to the present invention, with a pore volume of 0.102 cm$^3$/g.

DESCRIPTION OF THE PREFERRED EMBODIMENTS

Washed mining waste material withdrawn from a separation plant in the Ruhr region is classified at 56 mm. The coarse portion is crushed in a jaw crusher and milled in a disk crusher. The milled material has the following average sieve analysis:

| Granulation | (mm) | % by weight | % by weight |
|---|---|---|---|
| 3.15 | −1.0 | 64.86 | |
| 1.0 | −0.5 | 8.52 | |
| 0.5 | −0.2 | 5.62 | 79 |
| 0.2 | −0.125 | 3.79 | |
| 0.125 | −0.063 | 3.98 | |
| 0.063 | −0.0464 | 4.82 | |
| 0.0464 | −0.0292 | 0.87 | |
| 0.0292 | −0.0094 | 1.85 | |
| 0.0094 | −0 | 5.69 | 21 |
| | | 100.00 | 100 |

The finest grain portion, up to 0.2 mm grain size, amounts therefore to about 21% by weight.

A coarse assessment of the rock types contained in the washed mining waste material shows preeminently different clay slate, sand-clay slate and sandstone. The roentgenographic examination gives mainly the following mineral inventory: 20–30% by weight quartz; 50–60% by weight illite, 10% kaolinite, 5–10% siderite, clearly less than 5% feldspar and chlorite, with practically no dolomite detectable. The mining waste material assay shows therefore a mineral distribution typical for the separated waste from hard coal mining, namely different aluminum silicate oxide minerals and carbonates. In the examples all weights of the materials to be mixed are related to the mineral aggregate material including 4 to 5% by weight of humidity.

EXAMPLE 1a

The milled washed mining waste material granulates are mixed with 6.5% by weight potassium hydroxide and 5.2% by weight water, and then, after a mature time (reaction period) of 1.5 hours, pressed into molds with a pressure of 20 N/mm$^2$. The shaped brick is hardened in autoclaves at 16 bar and 220° C. for 4 hours. The prepared shaped brick contains 93% washed mining waste material granulates and 7% lime, calculated as total CaO; free CaO is not present. The silicic acid portion amounts to 57% by weight. The dry shaped bricks have a crude density of 2070 kg/mm$^3$; in atmospheric moisture the bricks have a bending strength of 6.3 N/mm$^2$ and a resistance to compression of, on the average, 25.9 N/mm$^2$. Testing of freeze-proofness reveals no injury whatsoever in the shaped bricks after 50 frost cycles; their resistance to compression is decreased at most 20% after 50 frost cycles. The pore volume of the shaped brick amounts to about 0.1 cm$^3$/g; the FIGURE shows the distribution of the pore radii; 80% of all pores have a pore radius up to maximum 0.1 um. The bricks are sharp-edged and display a smooth surface.

EXAMPLE 1b

With setting in a steam chamber, the resistance to compression, under otherwise similar conditions, comes to just under 20 N/mm². With setting in air, a resistance to compression of 22 N/mm² is determined after 28 days.

EXAMPLE 2a

For this example the coarse mining waste material separated through classification is added to other mining waste material (forward mining waste material from the driving gallery sometimes called "pit stone"). The portion of this other mining waste material comes to 30% by weight of the total aggregate. The mining waste material is ground as described in Example 1a, and mixed with 7% by weight calcium hydroxide as well as 6% by weight water, pressed into molds after maturing, and hardened as described.

The bricks of this series are lighter in color, displaying however in their other characteristics no significant deviations when compared to the bricks prepared according to Example 1a.

EXAMPLE 2b

This example is performed according to Example 1b, however the mining waste material is used as aggregate with a modified grain band. After screening away the fine grain portion 0–0.2 mm, and with addition of 40% by weight coarse sand 2–8 mm, using a mixing ratio of 25 kg aggregate material from mining waste material, 4.3 kg cement and 1.3 l H$_2$O, after setting in air for 28 days, a compression-resistance of 37.3 N/mm² is determined.

EXAMPLE 3a

For this example, the coarse mining waste material separated through classification, as in Example 1a, is ground, and subsequently mixed with a portion of 15% by weight flue ash. For this, the dust from a fluidized bed testing plant loaded with fine washed mining waste material of 0–5 mm grain size, is removed. The total aggregate is mixed with 7% calcium hydroxide as well as 6% by weight water, and after a mature period as described, hardened. Through the addition of the flue ash, the crude density is reduced to 1620 kg/mm³.

EXAMPLE 3b

As in Example 3a, the separated coarse mining waste material is ground and subsequently mixed with a portion of 15% by weight flue ash. As flue ash is used dust withdrawn from a fluidized bed furnace (experimental plant), which had been loaded with fine washed mining waste material of 0–5 mm grain size. The total aggregate is mixed with 10% cement as well as 10% by weight water, and pressed into molds. Through the addition of the flue ash, the crude density is reduced to 1650 kg/mm³.

EXAMPLE 4a

This example follows the method of Example 3a, but the flue ash is replaced by bed ash from the fluidized bed furnace. The bed material is likewise composed of fine washed mining waste material up to 5 mm grain size, but without the finest portion separated by the filter dust removal (filter dust portion). The mixture is likewise easily pressable. The prepared bricks display, after hardening, a granular surface, and have a determined crude density of 1795 kg/mm³.

EXAMPLE 4b

This example is otherwise performed as in Example 3b, but the flue ash is replaced with bed ash from the fluidized bed furnace. The bed material is likewise composed of fine washed mining waste material up to 5 mm grain size, however without the separated filter dust portion. The mixture is likewise easily pressable. The prepared bricks display, after hardening, a granular surface, with an average crude density determined to be 1800 kg/mm³.

EXAMPLE 5

For this example, the aggregate, as described in Example 2a, is ground and mixed with a portion of 10.5% by weight burnt lime and 13.5% by weight water, as well as reaction-promoting and boiling point-increasing components sodium hydroxide (2.5% by weight) and water glass (4.0% by weight). After homogenization, the mixture is cast into molds and after 3 hours mature time, heated continuously to 160° C. over a time period of 240 minutes, and then, after a pause of 5 hours, cooled. The shaped bricks display a crack-free and closed surface.

EXAMPLES 6a/b

For these examples, the washed mining waste material separated through classification up to 56 mm grain size, according to Examples 1a and 2b, is sorted according to density, whereby a crude density of 2.5 kg/l is adjusted and the heavy material further worked up in similar manner, in particular milled to the granulation according to the table. The prepared bricks have practically identical characteristics, in particular with regard to bending strength, resistance to compression and freeze-proofness.

As a rule, it suffices to determine the density of the prepared, ground aggregate material or an appropriately worked up sample, for the sake of simplicity, as crude density, for example pycnometrically. More accurate values are provided by the material density, which is determined with a grinding of a sample of the material to a granulation up to maximum of 0.063 mm.

It will be understood that each of the elements described above, or two or more together, may also find a useful application in other types of bricks differing from the types described above.

While the invention has been illustrated and described as embodied in a hydraulically setting shaped brick, particularly for construction, and a method for its production, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Hydraulically setting shaped brick for construction composed of
   (a) 4–30% by weight hydraulically binding agent;

(b) about 60-95% by weight mineral aggregate material as substitute for sand; and
(c) 0-10% other admixtures, the aggregate material comprising country rock (mining waste material) with striking disintegration tendency, obtained from digestion and/or from extraction of mineral wealth from mining, and having a grain size up to 15 mm and a finest grain portion under 0.2 mm from 10 to 45% by weight.

2. Shaped brick according to claim 1, wherein said aggregate material is extracted from coal mining.

3. Shaped brick according to claim 2, wherein said aggregate material is extracted from hard coal mining.

4. Shaped brick according to claim 1, wherein a portion of at least 50% by weight of said aggregate material is ground washed mining waste material.

5. Shaped brick according to claim 1, wherein said aggregate material displays up to 60% by weight of a granulated hard material, composed of or produced from a hard rock or metal.

6. Shaped brick according to claim 1, silicate hydrate bound with 5-10% by weight line, calculated as CaO, and displaying 88 to 95% by weight aggregate material containing about ⅓ to ⅔ silicic acid, as well as residual 0-2% by weight other additions.

7. Method for the production of shaped brick according to claim 1, in which a mixture of binding agent, granulated aggregate material and water is poured or pressed into molds and subsequently hardened under pressure or, under addition of reaction-promoting and boiling point elevating substance, hardened at normal pressure, comprising grinding mining waste material to a grain band up to maximum 15 mm grain size, with a finest grain portion under 0.2 mm from 10 to 45% by weight, and using the so-obtained mining waste material granulates as aggregate material.

8. Method according to claim 7, wherein said mixture is hardened under pressure in autoclaves.

9. Method according to claim 7, wherein said mixture is hardened at normal pressure, under addition of sodium hydroxide.

10. Method according to claim 7, wherein said grinding constitutes milling or recovering through separation measures.

11. Method according to claim 7, wherein said grinding is performed to a grain band up to maximum 5 mm.

12. Method according to claim 7, wherein the finest grain portion of the mining waste material granulates under 0.2 mm grain size amounts to from 18 to 35% by weight.

13. Method according to claim 12, wherein the finest grain portion of the mining waste material granulates displays the following size ranges (grain sizes): 0-0.1 mm, 4 to 10% by weight; and 0.01-0.2 mm, 14 to 31% by weight.

14. Method according to claim 7, further comprising classifying the mining waste material in a granulation range from 0 mm up to about 200 mm or more in such manner as to discharge (classify out) a grain band up to maximum 60 mm, leaving a separated coarse portion, grinding said coarse portion to said grain size up to 15 mm with said finest grain portion under 0.2 mm from 10 to 45% by weight and using said ground coarse portion as aggregate material.

15. Method according to claim 14, wherein a grain band up to 56 mm is discharged.

16. Method according to claim 14, wherein only a grain band up to maximum 30 mm is discharged.

17. Method according to claim 7, using as starting material, mining waste material as it is obtained as partial stream from individual separation steps.

18. Method according to claim 14, further comprising sorting the mining waste material with a grain band up to 60 mm to such an extent as to obtain a crude density of at least 2.1 kg/l, grinding this material to the necessary granulation, and using the ground material as aggregate material.

19. Method according to claim 18, wherein said sorting is performed to obtain a crude density of 2.5 kg/l or more.

20. Method according to claim 7, further comprising, after grinding, classifying said mining waste material granulates, and using those in a grain size range above about 0.01 mm for cement-bound shaped brick.

21. Method according to claim 20, wherein mining waste material granulates in a grain size range above 0.063 mm are used for cement-bound shaped brick.

22. Method according to claim 20, further comprising adding the mining waste material granulates in a grain size range below about 0.01 mm to the mining waste material granulates for silicate hydrate-bound shaped brick.

23. Method according to claim 22, wherein the granulates in a grain size range below 0.063 mm are added to the granulates for silicate hydrate-bound shaped brick.

24. Method according to claim 7, further comprising, before said grinding, adding to the mining waste material at least a part of the amount of binding agent in the form of burned lump lime.

25. Method according to claim 7, wherein said aggregate material contains a portion up to 50% by weight of light aggregate material.

26. Method according to claim 25, wherein said light aggregate material is flue dust.

27. Method according to claim 25, wherein said aggregate material further comprises hard aggregate.

28. Method according to claim 27, wherein said hard aggregate is pea gravel.

29. Method according to claim 7, wherein the mixture is pressed into molds with a pressing moisture below 5% by weight.

30. Method according to claim 29, wherein said pressing moisture is about 3% by weight.

31. Method according to claim 29, wherein the mixture contains 5 up to at most 7% by weight lime, calculated as CaO, or 5 up to at most 30% by weight cement as binding agent.

32. Method according to claim 7, further comprising, before said grinding, mixing coarser mining waste material with finer washed mining waste material to decrease dust.

33. Method according to claim 7, further comprising before the grinding, mixing finer washed mining waste material with coarser mining waste material to reduce water content.

* * * * *